(12) United States Patent
Longone

(10) Patent No.: US 6,473,547 B2
(45) Date of Patent: Oct. 29, 2002

(54) OPTICAL COMPONENTS

(75) Inventor: Roberto Longone, Witham (GB)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/775,024

(22) Filed: Jan. 31, 2001

(65) Prior Publication Data

US 2002/0006243 A1 Jan. 17, 2002

(30) Foreign Application Priority Data

Feb. 1, 2000 (GB) .............................. 0002277

(51) Int. Cl.[7] ............................... G02B 6/26
(52) U.S. Cl. ........................................ 385/40
(58) Field of Search ........................... 385/39, 40, 41

(56) References Cited

U.S. PATENT DOCUMENTS 5,185,830 A * 2/1993 Nishimoto .................... 385/11
5,617,493 A * 4/1997 Nishimoto .................... 385/40

FOREIGN PATENT DOCUMENTS

| EP | 0201684 | 11/1986 |
| EP | 1020754 | 7/2000 |
| JP | 63096626 | 4/1988 |
| JP | 02006026 | 1/1990 |
| JP | 04149408 | 5/1992 |
| JP | 05264938 | 10/1993 |

* cited by examiner

Primary Examiner—Tulsidas Patel
(74) Attorney, Agent, or Firm—Allen, Dyer, Doppelt, Milbrath & Gilchrist, P.A.

(57) ABSTRACT

An optical component, such as, for example, a Mach-Zehnder modulator, in which the ground electrodes are formed directly on a surface of a substrate, that is, without the intermediary of or presence of conventional buffer dielectric layers. Forming the optical component without a dielectric layer between the ground electrodes and the substrate allows for a reduction in the drive voltage in the operation of the modulator.

7 Claims, 2 Drawing Sheets

OPTICAL COMPONENTS

REFERENCE TO RELATED APPLICATION

This application claims priority benefits of prior filed co-pending British patent application No. 00 02277.2, filed Feb. 1, 2000, entitled, INTEGRATED OPTICAL COMPONENTS, and is incorporated herein by reference thereto.

FIELD OF THE INVENTION

The present invention relates to an optical component and in particular to a component having an optical waveguide formed in a substrate.

BACKGROUND OF THE INVENTION

The manufacture of integrated optical components intended for use in the telecommunications industry for the transmission of data with optical signals is well known in the art. A typical manufacturing technique for such a component is the employment of a lithium niobate substrate cut from a wafer of this material and thereafter forming an optical waveguide or waveguides including branched waveguides or Mach-Zehnder configurations of the required configuration in the surface of the substrate. The optical waveguide of the required configuration may be formed in the substrate such as by a selective titanium diffusion process. The substrate is then processed in a manner to provide it with the required operating characteristics. For example, an electrode structure may be formed on the surface of the substrate, spatially with the longitudinal extent of the formed optical waveguide so that electrical signals supplied to the electrode structure may influence the propagation and characteristics of an optical signal along the waveguide. The substrate is then mounted in a package appropriate with input and output optical and electrical connections providing for signal coupling and controlling of the operation of the component. The packaged component may, then, be deployed within an optical communication system.

Before a required electrode structure can be formed on the substrate, a buffer layer is deposited on the surface of the substrate. The buffer layer is, for example, a layer of silicon dioxide or some other dielectric material. After the formation of the buffer layer, the electrode structure is formed on the buffer layer as is known in the art. The buffer layer isolates the metal electrodes from the waveguides and also allows the realization of required microwave performance. The use of a buffer layer serves as increased spatial separation of the electrodes from the optical waveguide formed in the substrate. Consequently, the overlap between the optical field within the waveguide or waveguides, with respect to the electrical field produced between the electrodes of the electrode structure, will depend upon the thickness of the buffer layer, as well as the physical and electrical properties of the buffer layer. As a result, it is generally necessary to employ a drive voltage for the electrodes which is higher than might otherwise be required in view of the presence of the buffer layer.

It is an object of the present invention to reduce the magnitude of the drive voltage required for operation of electrodes utilized in the control of an optical device.

SUMMARY OF THE INVENTION

According to this invention, an optical component comprises a substrate in which is formed an optical waveguide and an electrode structure formed on a surface of the substrate to influence propagation of the light along the waveguide when driven with a suitable control signal, the electrode structure comprising at least one ground electrode and a signal electrode. The ground electrode is formed on the surface of the substrate and a buffer layer is formed between the surface of the substrate and the signal electrode. Advantageously, embodiments of the present invention enhance the performance of an optical system employing such an integrated optical component to allow a reduction in the drive voltage while still achieving desired performance characteristics.

It will be appreciated that in achieving the objective of this invention that, in the embodiments of the present invention, the ground electrodes are formed directly on the surface of the substrate, i.e., in particular, a buffer layer is not provided on the surface of the substrate in the region of the ground electrode, although a buffer layer is provided between the signal electrode and the substrate. The buffer layer must be sufficiently thick to reduce optical absorption losses induced by the proximity of the signal electrode to the waveguides. The lack of a buffer layer between the ground electrode and the substrate allows a reduction in the required drive voltage.

A typical integrated optical component may have more than one optical waveguide and consequently more than one electrode structure on the substrate. In such a case, it may be necessary to provide a buffer layer between more than one electrode and the substrate to achieve a desired reduction in optical losses. For example, in the case of a Mach-Zehnder modulator, there may be two branch waveguides with ground electrodes disposed either side of the two branches, and a single signal electrode disposed between the two branches. In such an arrangement, the signal electrode alone may be isolated from the substrate by means of a buffer layer, and the two ground electrodes are provided directly, without the intermediary of a dielectric buffer layer, on the upper surface of the substrate. However, in the application of a chirped modulator, a buffer layer is provided between one of the ground electrodes and a corresponding waveguide positioned under that ground electrode.

Empirical tests of various embodiments have shown that it is possible to reduce the drive voltage supplied to the signal electrode by 5% to 15%, without compromising the performance of the optical component. Having regard to the very high frequencies at which a typical integrated optical component is required to operate, a reduction in voltage of this order of magnitude is most significant, and so greatly reduces the design specification with which the drive electronics must comply.

Preferably, the substrate for realizing an embodiment of the present invention will be an x-cut lithium niobate substrate. Accordingly, the buffer layer will preferably be a layer of silicon dioxide. Such a buffer layer may be formed by depositing over the entire surface of the substrate a layer of silicon dioxide and then chemically removing that portion where the layer is not required. Other dielectric materials, as known and used in the art, may be used to form the buffer layer. Alternatively, the region where a layer is not required may be masked prior to silicon dioxide deposition in order to produce a buffer layer only in regions where subsequently formed electrodes are dialectically isolated from the waveguides.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

DETAILED DESCRIPTION OF THE INVENTION

Figure 1:
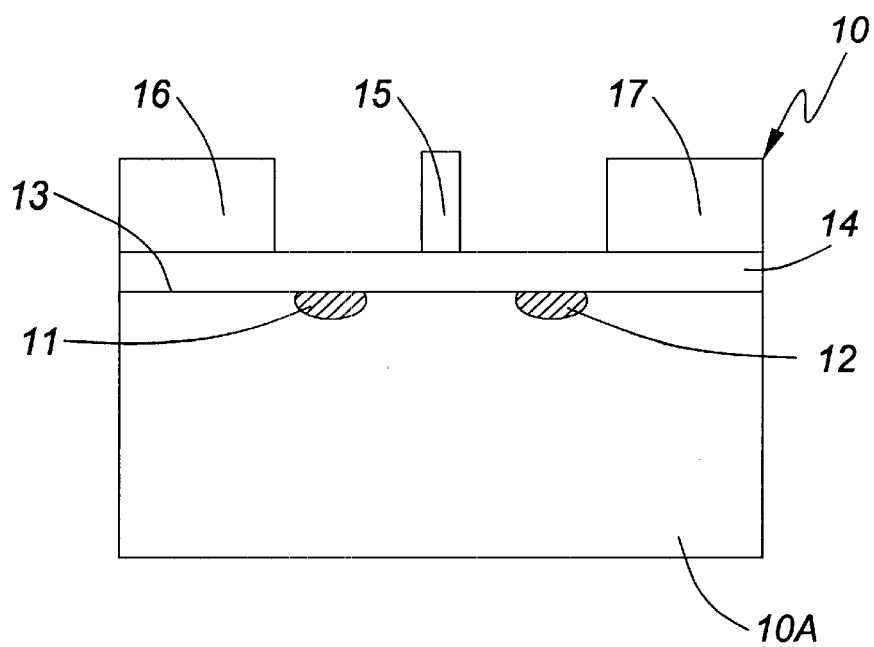
FIG. 1 is a schematic cross-sectional view through a known Mach-Zehnder integrated optical modulator.

Referring now to FIG. 1, there is shown an optical device or component 10 having a substrate 10A cut from a wafer of lithium niobate and having formed therein an optical waveguide structure for a x-cut modulator 10 which includes two waveguide branch arms 11 and 12 forming a Mach-Zehnder configuration. A buffer layer 14 of silicon dioxide is deposited on the upper surface 13 of the substrate. The buffer layer typically has a thickness of between about 0.5 $\mu$m to 2.0 $\mu$m which is sufficient to provide good electrode isolation to reduce optical absorption losses to an acceptable level.

Electrodes are formed on the buffer layer so as to have the required relative disposition with respect to the waveguide arms 11 and 12. As shown, for a modulator, a signal electrode 15 is provided between the two branch waveguides arms 11 and 12, as well as ground electrodes 16 and 17 disposed outwardly of the two branch waveguide arms 11 and 12. Manufacture of the modulator is completed by mounting the substrate 10A in a suitable package (not shown).

Figure 2:
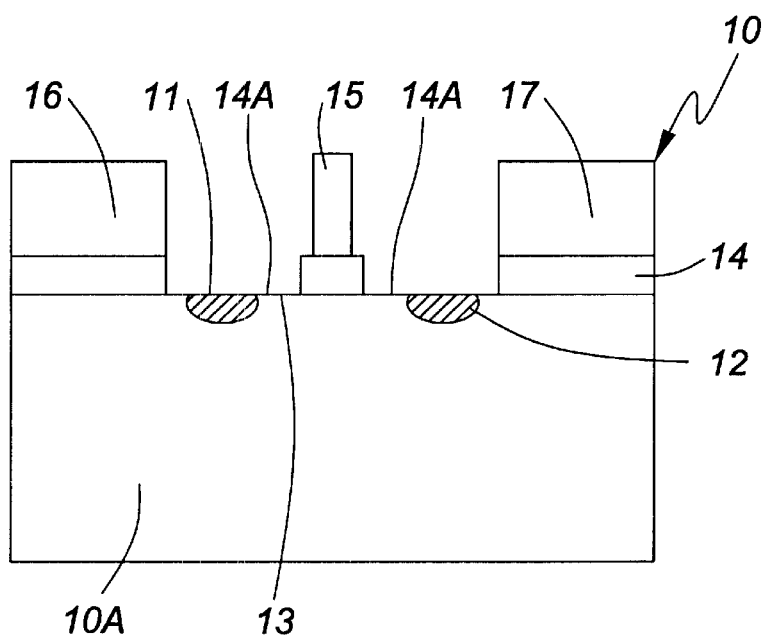
FIG. 2 is a schematic cross-sectional view through a modulator as known in the art.

The fabrication of the conventional modulator structure, as described above, may be modified so that the buffer layer 14 extends only beneath the regions of electrodes 15, 16 and 17, as illustrated in FIG. 2. This may be achieved by masking areas 14A of the substrate where no buffer layer is required and then depositing the silicon dioxide only where the electrodes are to be formed.

Figure 3:
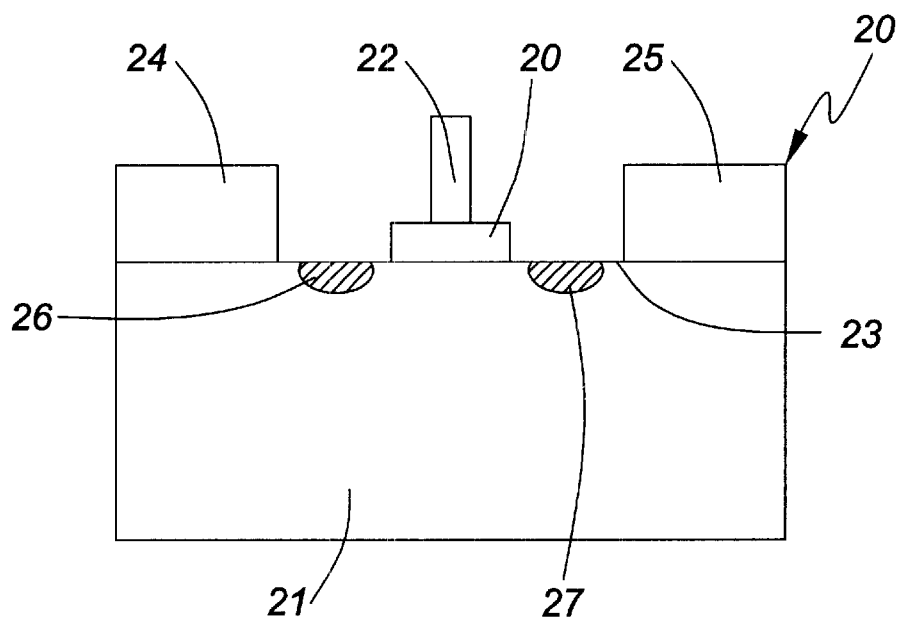
FIG. 3 illustrates a schematic cross-sectional view through an integrated optical modulator according to a first embodiment of this invention.

FIG. 3 shows an optical component comprising a x-cut modulator 20 arranged in accordance with a first embodiment of this invention. A buffer layer 20' is formed on the substrate 21 only in the region of signal electrode 22 and no buffer layer is formed on surface 23 of substrate 21 where the ground electrodes 24, 25 are subsequently formed. Ground electrodes 24, 25 are formed directly on surface 23 of the substrate, i.e., without the intermediary of the underlying of a dielectric buffer layer. This has the effect of better locating the branch waveguide arms 26, 27 in the electrical field produced between the signal electrode 22 and the two ground electrodes 24, 25 which, in turn, allows a lower drive voltage to be employed to modulate the modulator output. The buffer layer 20' has a width, in the plane of the substrate surface, greater than the width of signal electrode 22.

A typical x-cut lithium niobate modulator 20 arranged as shown in FIG. 3 may having a silicon dioxide buffer layer 20' with a thickness of about 0.5 $\mu$m to 2.0 $\mu$m and a gap between the signal electrode 22 and each of the ground electrodes 24, 25 of between about 10 $\mu$m to 50 $\mu$m, has been found to allow a reduction in the drive voltage of between approximately 5% to 15%, without in any way compromising the performance of the modulator relative to the performance achieved from modulators of the type shown in FIGS. 1 and 2.

Figure 4:
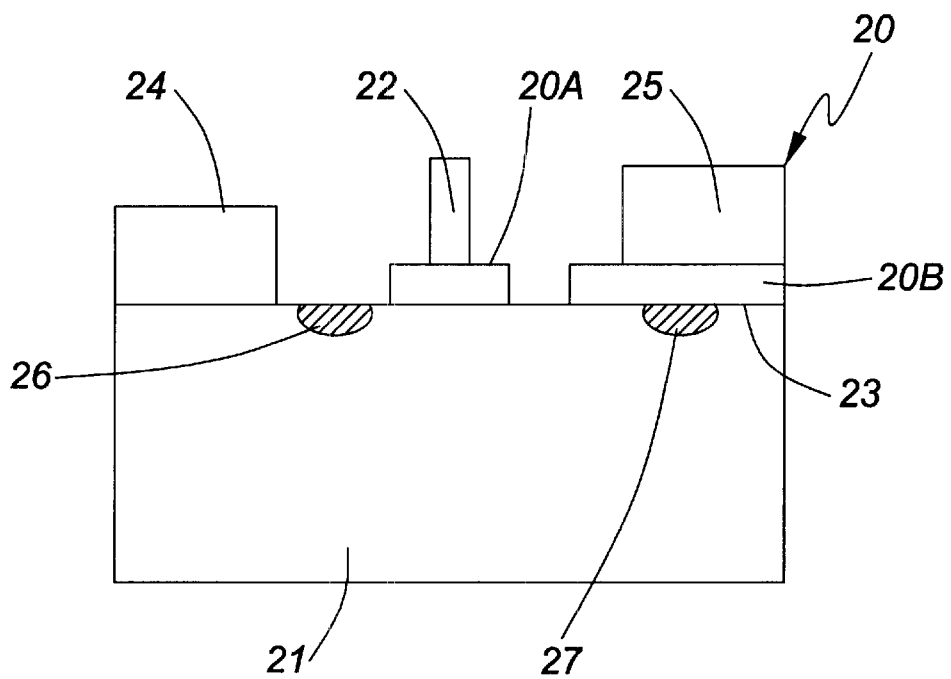
FIG. 4 schematically illustrates a second embodiment for a chirped modulator comprising this invention.

FIG. 4 shows an alternative modulator construction according to a second embodiment of this invention. Parts in common with FIG. 3 retain the same reference numbers. The arrangement of FIG. 4 differs from that of FIG. 3 in that both signal electrode 22 and ground electrode 25 have respective buffer layers 20A and 20B, again, to reduce optical losses. Thus, buffer layers 20A and 20B are beneath drive electrode 22 and ground electrode 25, respectively, but not ground electrode 24, and extend beyond the width of their respective electrodes. In this embodiment, at least partial reduction in drive voltage in modulator modulation is achieved.

It will be appreciated from the foregoing description that, as a result of this invention, a highly effective ad easily achieved method for reducing a Mach-Zehnder drive voltage requirements is fulfilled. It will be equally apparent and is contemplated that modification and/or changes may be made in the illustrated embodiment without departure from the invention. For example, although the above embodiments have been described with reference to a Mach-Zehnder modulator, the present invention is not limited to such modulators. The present invention can equally well be applied to a phase modulator. Furthermore, even though the embodiments have been illustrated in terms of the ground electrodes, or at least one of the ground electrodes, being formed directly on the surface of the substrate, i.e., without the intermediary of a buffer layer, embodiments can be realized in the which the thickness of the buffer layer is reduced beneath the ground electrodes, or at least one of the ground electrodes. Preferably, in such a case, the thickness of the buffer layer beneath the ground electrode or electrodes is less than the thickness of the buffer layer beneath the signal electrode.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above described exemplary embodiments, but should be defined only in accordance with the following claims and their equivalents.

What is claimed is:

1. An optical component comprising:
    a substrate;
    first and second optical waveguides formed in respective first and second spaced apart surface portions of said substrate;
    a first electrically insulating buffer layer formed on said substrate so as to overlie said first surface portion of said substrate;
    a second electrically insulating buffer layer formed on a third surface portion of said substrate between and spaced apart from said first and second surface portions of said substrate and from said first buffer layer;
    a first ground electrode formed on said first buffer layer so as to overlie said first optical waveguide, and being spaced apart from an edge of said first buffer layer and not being electrically connected to said substrate;

a signal electrode formed on said second buffer layer so as to overlie part of said third surface portion of said substrate, and being spaced apart from edges of said second buffer layer and not electrically connected to said substrate; and a second ground electrode formed directly on and thereby contacting a fourth surface portion of said substrate spaced apart from said third surface portion, such that said second surface portion of said substrate lies between said third and fourth surface portions of said substrate.

2. The optical component according to claim 1, wherein said substrate comprises a lithium niobate substrate having a planar surface.

3. The optical component according to claim 1, wherein said first and second buffer layers are made of silicon dioxide.

4. A method of applying an electrical field to an optical waveguide structure having first and second optical waveguides formed in respective first and second spaced apart surface portions of a substrate, said method comprising the steps of:

(a) providing a first electrically insulating buffer layer on said substrate so as to overlie said first surface portion of said substrate;

(b) providing a second electrically insulating buffer layer on a third surface portion of said substrate between and spaced apart from said first and second surface portions of said substrate and from said first buffer layer;

(c) forming a first electrode on said first buffer layer so as to overlie said first optical waveguide, while being spaced apart from an edge of said first buffer layer and not being electrically connected to said substrate;

(d) forming a second electrode directly on and thereby contacting a fourth surface portion of said substrate spaced apart from said second surface portion, such that said third surface portion of said substrate lies between said first and second surface portions of said substrate;

(e) forming a signal electrode layer on said second buffer layer so as to overlie part of said third surface portion of said substrate, while being spaced apart from edges of said second buffer layer and not being electrically connected to said substrate; and (f) applying a drive voltage between said signal electrode and said first and second electrodes, so as to produce an electric field in said first optical waveguide between said signal electrode and said first electrode layer on said first buffer layer, and to produce an electric field in said second optical waveguide between said signal electrode and said second electrode layer directly on said substrate.

5. The method according to claim 4, wherein step (f) comprises applying ground potential to said first and second electrodes.

6. The method according to claim 4, wherein said substrate comprises a lithium niobate substrate having a planar surface.

7. The method according to claim 4, wherein said first and second buffer layers are made of silicon dioxide.

* * * * *